United States Patent [19]
Yee et al.

[11] Patent Number: 6,126,373
[45] Date of Patent: Oct. 3, 2000

[54] METHOD AND APPARATUS FOR REALTIME REMOTE ROBOTICS COMMAND

[75] Inventors: Albert G. Yee, Fremont, Calif.; Hadi A. Akeel, Rochester Hills, Mich.; Michael A. McNeill, Hayward, Calif.

[73] Assignee: Fanuc USA Corporation, Elkgrove Village, Ill.

[21] Appl. No.: 08/994,103

[22] Filed: Dec. 19, 1997

[51] Int. Cl.[7] .................................................. B25J 3/00
[52] U.S. Cl. ..................... 414/5; 414/7; 395/99
[58] Field of Search ................... 414/4, 5, 6, 7; 395/99

[56] References Cited

U.S. PATENT DOCUMENTS

| | | | |
|---|---|---|---|
| 3,949,517 | 4/1976 | Reiner et al. | 46/45 |
| 4,302,138 | 11/1981 | Zarudiansky | 414/5 |
| 4,695,963 | 9/1987 | Sagisawa et al. | 364/513 |
| 4,972,074 | 11/1990 | Wright | 250/227.11 |
| 4,986,280 | 1/1991 | Marcus et al. | 128/774 |
| 4,986,723 | 1/1991 | Maeda | 414/729 |
| 5,143,505 | 9/1992 | Burdea et al. | 414/5 |
| 5,184,009 | 2/1993 | Wright et al. | 250/227.11 |
| 5,184,319 | 2/1993 | Kramer | 414/5 X |
| 5,354,162 | 10/1994 | Burdea et al. | 414/5 |
| 5,447,403 | 9/1995 | Engler, Jr. | 414/4 |
| 5,451,924 | 9/1995 | Massimino et al. | 340/407.1 |
| 5,512,919 | 4/1996 | Araki | 345/156 |
| 5,516,249 | 5/1996 | Brimhall | 414/5 |
| 5,587,937 | 12/1996 | Massie et al. | 364/578 |
| 5,599,151 | 2/1997 | Daum et al. | 414/7 |
| 5,617,515 | 4/1997 | MacLaren et al. | 395/99 |
| 5,631,861 | 5/1997 | Kramer | 414/5 X |

OTHER PUBLICATIONS

"VTI Introduces the CyberGrasp, Unveils Ground–Breaking Haptic Interface for the Entire Hand", 1997, Virtual Technologies Inc. Website at www.virtex.com.

"CyberGrasp VTI's Groundbreaking Haptic Interface for the Entire Hand", 1997, Virtual Technologies, Inc. Website at www.virtex.com/prod_cybergrasp.html.

"CyberGlove VTI's Award–Winning Instrumented Glove", 1997, Virtual Technologies, Inc. Website at www.virtex.com/prod_cyberglove.html.

*Primary Examiner*—Donald W. Underwood
*Attorney, Agent, or Firm*—Beyer Weaver & Thomas, LLP

[57] ABSTRACT

Methods and apparatus for controlling a remote device using a command glove system are disclosed. An apparatus for controlling a device is arranged to be at least partially supported on and operated by a human appendage. The apparatus is further arranged to transmit signals to and receive signals from the device, and includes a positioning assembly mounted on the human appendage. The positioning assembly is arranged to respond to motions of the human appendage, and also transmits position signals that are used to control the device. The apparatus includes a braking assembly which is arranged to resist motion of the positioning assembly, and responds to resistance signals received from the device. The apparatus also includes a sense effecting assembly which transforms haptic signals received from the device into sensations felt by the human appendage.

6 Claims, 5 Drawing Sheets

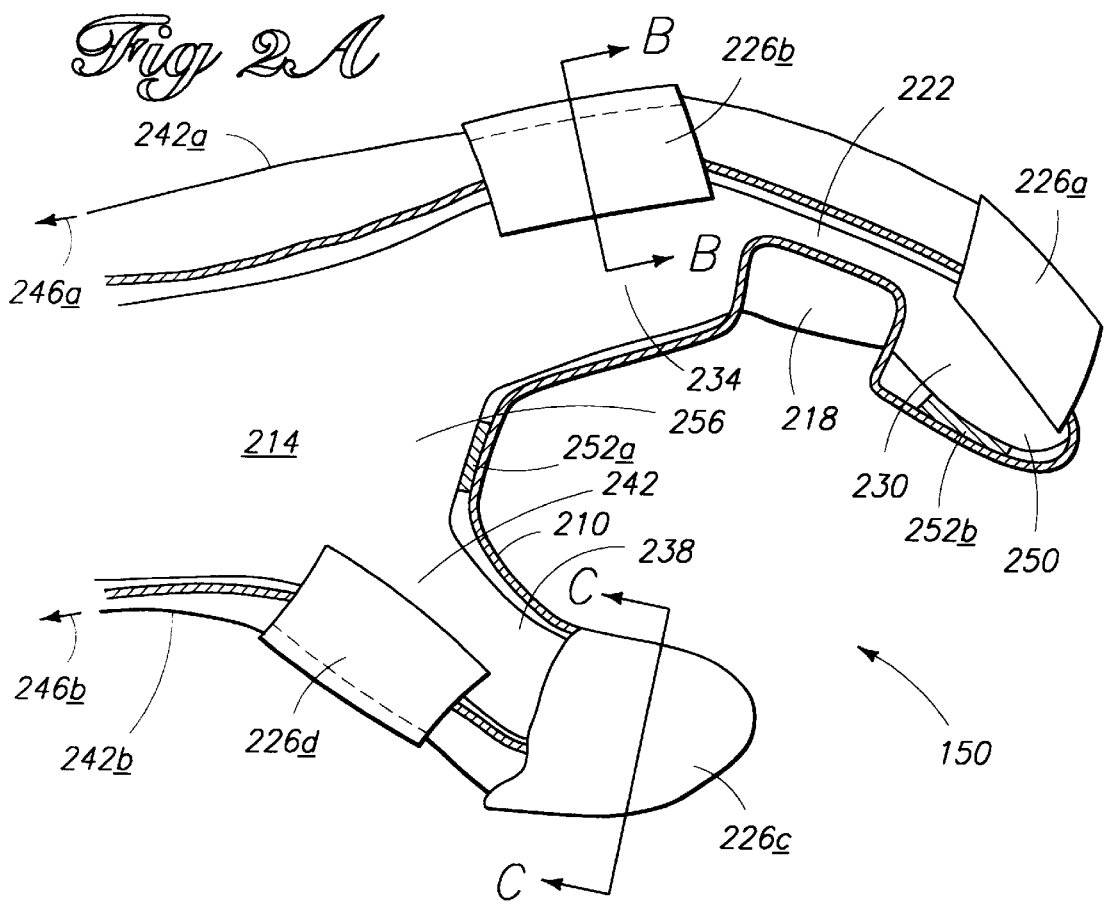
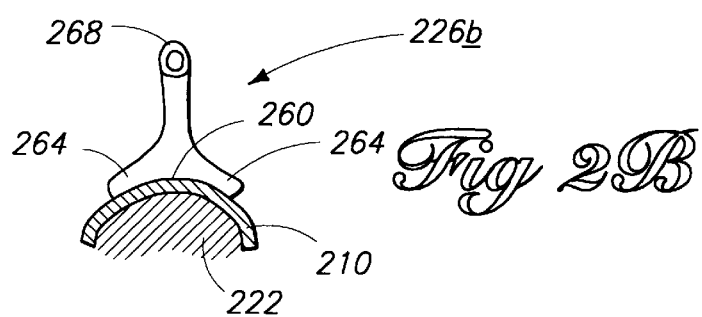
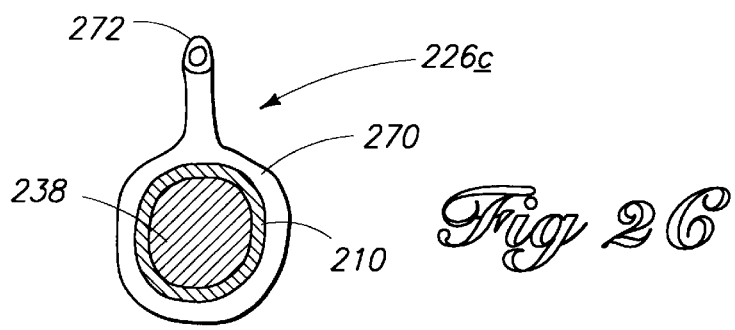

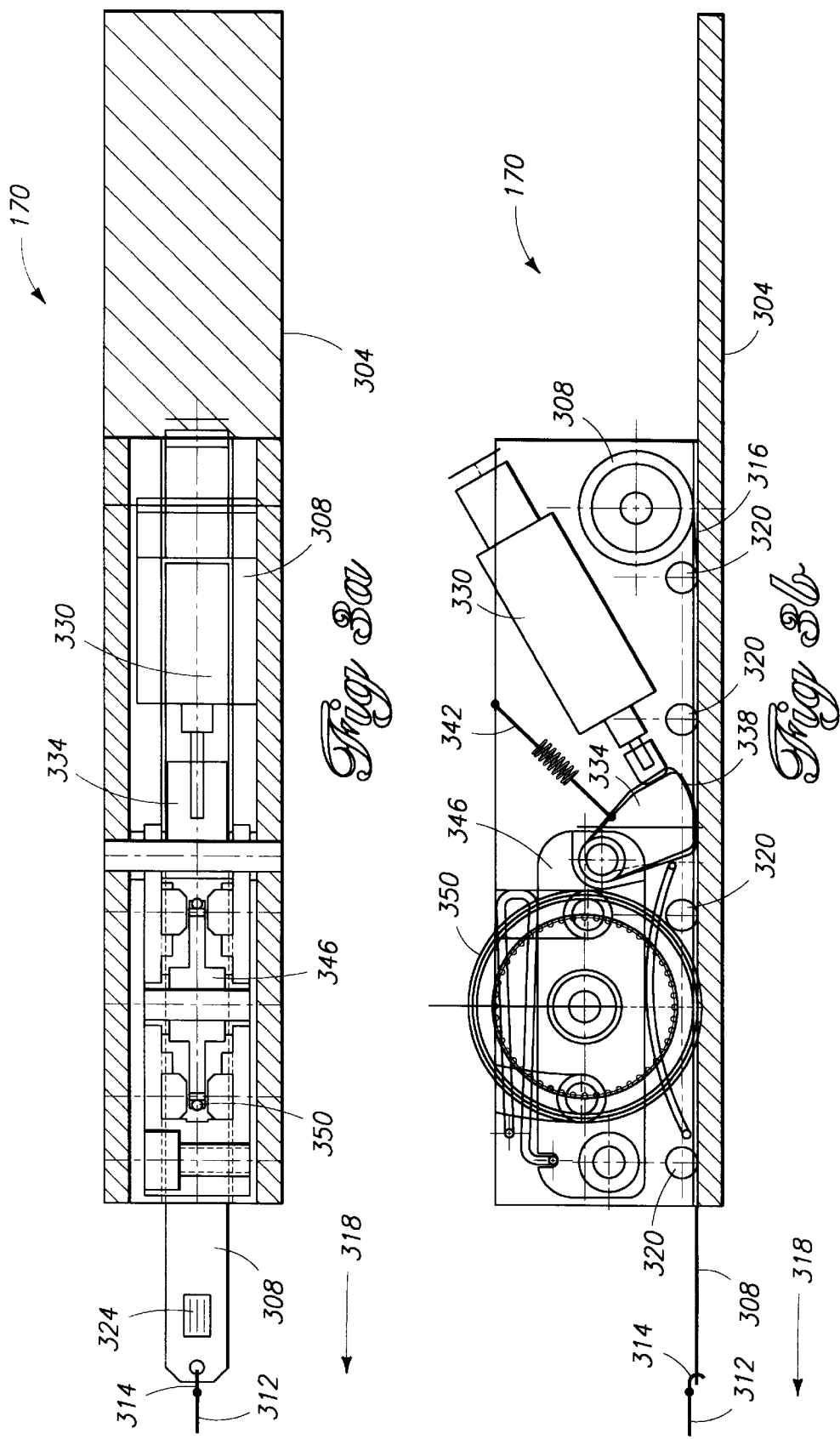

METHOD AND APPARATUS FOR REALTIME REMOTE ROBOTICS COMMAND

BACKGROUND OF THE INVENTION

1. Field of Invention

The invention relates generally to methods and apparatus for controlling robotic manipulators. More particularly, the invention relates to methods and apparatus for providing a user who is controlling a remote robotic manipulator with sensations relating to the environment in which the robotic manipulator is operating.

2. Description of Relevant Art

Robotic manipulators are often used to enable a user at one site to perform operations at a second site, e.g., a remote site. The use of robotic manipulators at remote sites allows operations to be performed at the remote site without exposing a person to the environment at the remote site. By way of example, a robotic manipulator may be used to retrieve objects from a hazardous environment, thereby preventing a person from having to enter the hazardous environment.

Robotic manipulators may generally be controlled using a variety of different mechanisms. One mechanism which is often used to control at least some movements of a robotic manipulator is a command glove system. Sensors associated with a command glove system are arranged to transmit human hand motions to a robotic manipulator and to receive signals from the robotic manipulator. Signals received from the robotic manipulator are often used to control human hand motions in response to forces encountered by the robotic manipulator. Some command gloves attempt to control substantially every degree of freedom in the human hand. Command gloves which are intended to control every degree of freedom in a hand generally require a significant number of electronic and mechanical components. Many command gloves, especially those which attempt to control every degree of freedom in a human hand, end to restrict the hand movement of a user who is wearing the command glove, since the volume of components required typically causes the command glove to be heavy and bulky, or otherwise difficult to manipulate. Further, a volume of electrical components often requires a significant amount of power usage.

In response to the motions and forces applied by a human hand, i.e., a hand using a command glove, an associated robotic manipulator moves and applies force to its surroundings. When the robotic manipulator applies force to its surroundings, sensors located on, or associated with, the robotic manipulator transmit force information from the robotic manipulator back to the glove, as mentioned above. Actuators located on the glove may then transfer the force information back to the human.

Actuators which transfer force information to a human generally do not simulate the actual sensations experienced by a robotic manipulator back to the human. By way of example, actuators on gloves are not arranged to simulate the sensations a human might be likely to feel when the human grasps a solid object. Instead, the glove, e.g., the TeleTact glove developed at the Advanced Robotics Research Center in the United Kingdom, may expand pneumatic bladders on the glove in response to increased forces "applied" to the robotic manipulator when the robotic manipulator grasps a solid object. However, when a human, or robotic, hand grasps a solid object, the object does not actually apply forces to the hand. Instead, the object resists the forces applied by the hand. Therefore, in some cases, the use of actuators to apply forces to a hand may not be an accurate simulation of sensations experienced by the robotic manipulator when the robotic manipulator grasps an object.

Some command gloves allow a user to experience vibrations which are present in the environment of a robotic manipulator. Such command gloves generally include vibration actuators which may be activated in response to signals transmitted from the robotic manipulator. By enabling the user to experience vibrations and forces felt by the robotic manipulator, the user is presented with a better sense of what the environment around the robotic manipulator is like.

Although vibration actuators are included in some command gloves in addition to force actuators, command gloves generally do not provide a user with force feedback and a sense of the thermal environment experienced by the robotic manipulator. In other words, information relating to the thermal environment of the robotic manipulator generally is not experienced by a user. Providing a user with thermal sensations, e.g., a sense of heat, experienced by the robotic manipulator would enable the user to monitor the thermal environment of the robotic manipulator and, hence, modify the actions of the robotic manipulator as necessary.

Therefore, what is desired is a method and an apparatus for efficiently and accurately providing a sense of the environment which is being experienced by a robotic manipulator to a user that is commanding the robotic manipulator. Specifically, what is desired is a relatively lightweight command glove which consumes a minimum of external power, and accurately provides a user with a haptic sense of the environment in which a robotic manipulator is operating.

SUMMARY OF THE INVENTION

The present invention relates to methods and apparatus for to controlling a remote device. According to one aspect, an apparatus for controlling a device is arranged to be at least partially supported on and operated by a human appendage. The apparatus is further arranged to transmit signals to and receive signals from the device, and includes a positioning assembly mounted on the human appendage. The positioning assembly is arranged to respond to motions of the human appendage, and also transmits position signals that are used to control the device. The apparatus includes a braking assembly which is arranged to resist motion of the positioning assembly, and responds to resistance signals received from the device. The apparatus also includes a sensing assembly which transforms sensory signals received from the device into sensations felt by the human appendage.

In one embodiment, the sensory signals includes vibratory signals and thermal signals, and the sensing assembly includes a vibration actuator sub-assembly which provides the human appendage with a sense of vibrations experienced by the device, and a thermal sense effector sub-assembly which provides the human actuator with a sense of heat experienced by the device. In such an embodiment, the thermal sense effector sub-assembly may include both a thermoelectric cooler and/or a thin-foil heater.

In another embodiment, the positioning assembly includes a spring, e.g., a constant force spring, that extends in response to motions of the human appendage. In such an embodiment, the braking assembly includes a brake arranged to prevent the constant force spring from extending in response to the resistance signals received from the device, and a solenoid that is arranged to activate the brake in response to the resistance signals received from the device.

The apparatus may also include a first support fin supported on a distal phalanx of a finger, a second support fin arranged to be supported on a proximal phalanx of the finger, and a cable which couples the first support fin, the second support fin, and the braking assembly. The cable serves to cooperate with the first support fin, the second support fin, and the braking assembly in order to resist forces applied by the distal phalanx of the finger.

According to another aspect of the present invention, a method for receiving haptic sensations from a remote device, where one of the haptic sensations represents a resistive force encountered by the remote device, includes providing a positioning mechanism which is responsive to motions of a human appendage and is arranged to send position signals to the remote device, and mounting the positioning mechanism on the human appendage. The method also includes moving the human appendage, thereby causing the positioning mechanism to engage, and controlling movement of the remote device with the position signals. Resistive forces encountered by the remote device during the movement of the remote device are sensed, and a resistance signal, which is a function of the sensed resistive forces, is produced. A resistance mechanism for resisting motion of the positioning mechanism is provided, and the resistance signal is transmitted to the resistance mechanism, which engages the positioning mechanism to resist motion of the positioning mechanism. In one embodiment, the method further involves providing a constant force spring arrangement and a braking element engaging the spring.

In another embodiment, the resistance mechanism is provided by a hydraulic cylinder which controls the resistance by controlling fluid flow, such as air flow, within the hydraulic cylinder. In still another embodiment, the method includes sensing a thermal sensation encountered by the remote device during the movement of the remote device, and producing a thermal signal as a function of the sensed thermal sensation. In such an embodiment, the method also includes providing a heat source on the human appendage, and transmitting the thermal signal to the heat source to provide an approximation of the thermal sensation to the human appendage.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 2a is a diagrammatic representation of section A—A of the sensor feedback glove of FIG. 1 in accordance with an embodiment of the present invention.

FIG. 2b is a diagrammatic cross-sectional representation of a proximal phalanx support fin in accordance with an embodiment of the present invention.

FIG. 2c is a diagrammatic cross-sectional representation of a thumb tip support fin in accordance with an embodiment of the present invention.

FIG. 3a is a diagrammatic top-view representation of a brake actuator assembly, e.g., the brake actuator assembly of FIG. 1, in accordance with an embodiment of the present invention.

FIG. 3b is a diagrammatic side-view representation of the brake actuator assembly of FIG. 3a in accordance with an embodiment of the present invention.

DETAILED DESCRIPTION OF THE EMBODIMENTS

Figure 1:
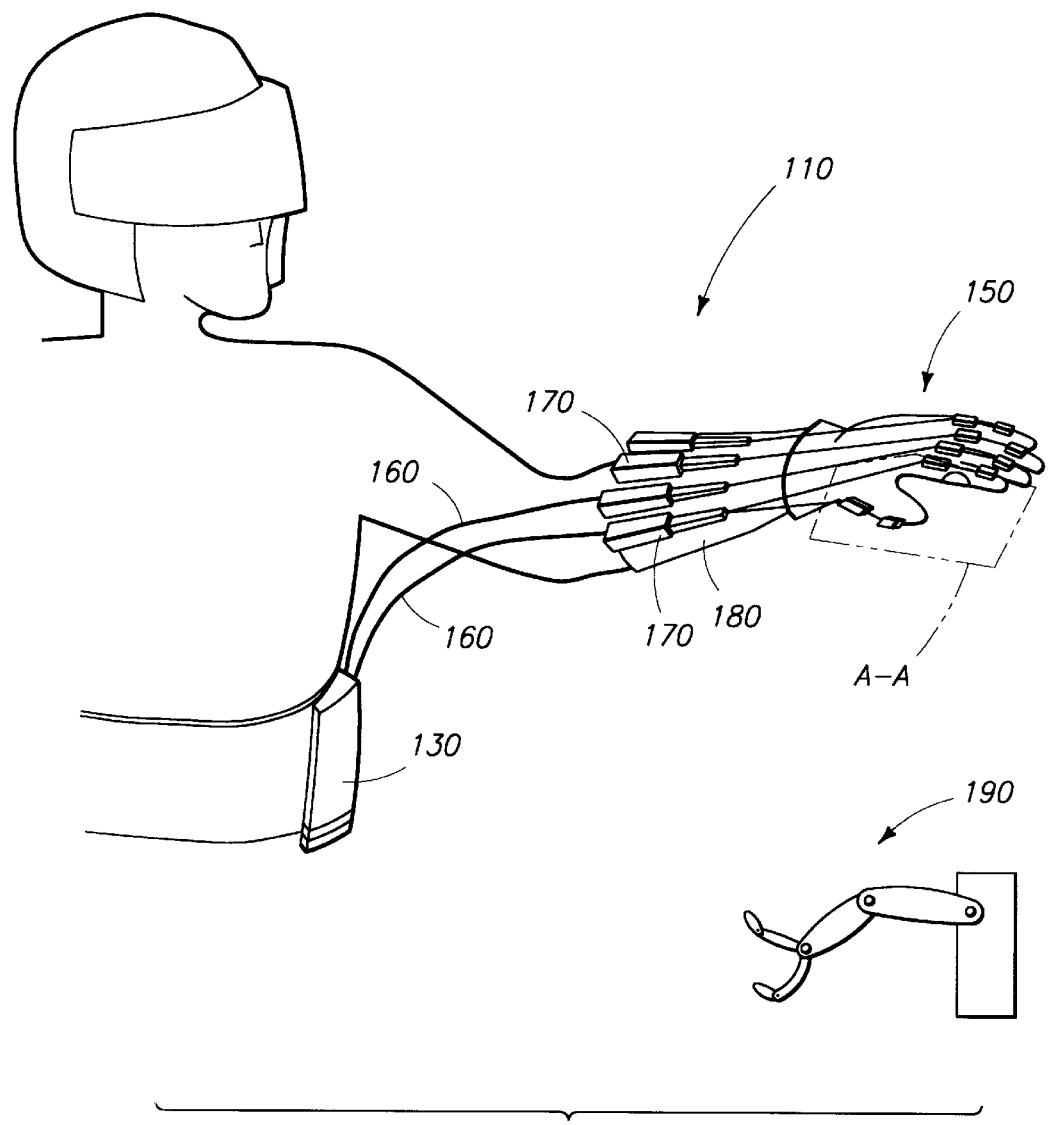
FIG. 1 is a diagrammatic representation of a command glove system in accordance with an embodiment of the present invention.

A command glove system which is used to command a robotic manipulator, or device, typically includes a variety of electronic and mechanical components which are arranged to transmit commands to, and receive force feedback signals from, the robotic manipulator. The electronic and mechanical components used in a command glove system typically include actuators which apply forces to a human hand in response to forces experienced by the robotic manipulator. Such actuators, e.g., air bladders, require a variety of electronic and mechanical components, and also typically use a significant amount of external power.

Some command gloves are further arranged to control substantially every possible degree of freedom in a hand. Command gloves which are intended to control every possible degree of freedom in a hand often require a relatively large number of electronic and mechanical components to achieve control of every degree of freedom. Command glove systems also typically do not provide a user with a realistic sense of haptic, e.g., tactile, sensations experienced by the robotic manipulator that is being commanded. By way of example, many conventional command gloves provide a user with a sense of force, i.e., force feedback, and may also provide a user with a sense of vibrations experienced by the robotic manipulator. However, conventional command gloves generally do not provide a user with force feedback, a sense of vibrations, and a sense of the thermal environment experienced by the robotic manipulator.

A command glove which is arranged to resist forces applied by a user uses brakes, or other non-backdriving elements, in lieu of actuators which apply forces to a user. Such a command glove "reflects" forces and, therefore, provides a user with an accurate sense of the forces felt by a robotic manipulator, essentially by restricting the motion of the hand of the user. By way of example, when a hand picks up a solid object, the solid object does not apply forces to the hand. Instead, the object resists forces applied by the hand and, hence, reflects forces applied by the hand back to the hand.

The reduction of the number of actuators on a command glove reduces the weight of the command glove, and, hence, allows the command glove to be more easily manipulated.

Reducing the number of actuators on the command glove also reduces the amount of external power required by the command glove. In order to further reduce the weight of a command glove such that a user wearing the glove has substantially unrestricted hand movement, the glove may be arranged to control only selected degrees of freedom. That is, rather than designing the command glove to control every degree of freedom in a human hand, for example, the command glove may be designed to control selected degrees of freedom which are determined to substantially compose the majority of standard human hand motions. As such, hand movement may be essentially unrestricted without greatly compromising the number of standard human hand motions which may be controlled.

Providing a user with a true sense of the operating environment of a robotic manipulator enables the user to better adjust the control of the robotic manipulator as necessary. For example, providing the user with thermal sensations experienced by the robotic manipulator enables the user to sense when the robotic manipulator obtains an object which may melt, or otherwise damage, components on the robotic manipulator. Accordingly, a command glove may be designed to include a variety of sensors and actuators which are used to enable a user to experience haptic sensations of forces encountered by a robotic manipulator. Such sensors and actuators may generally include a vibration actuator that is arranged to provide a sense of vibration, and a thermal sensor arrangement that is arranged to provide a sense of heat. The sensor arrangement may include a sense effecting mechanism such as a thermoelectric cooler, a thin foil heater, and a temperature sensor, e.g., a thermocouple and associated circuitry that is arranged to calculate a temperature level.

In general, a command glove system which is arranged to resist forces and to provide a user with haptic sensations may take on a variety of different configurations. With reference to FIG. 1, one configuration of a command glove system will be described in accordance with an embodiment of the present invention. A command glove system 110 includes a power supply 130 and a sensor feedback glove 150. Power supply 130 provides power to the sensors and the actuators of command glove system 110. Power supply 130 also includes electronic components, e.g., signal conditioning electronics and digitizing electronics, that are associated with signals which may be received by or transmitted from sensor feedback glove 150. As shown, power supply 130 is arranged to be worn by an operator. However, it should be appreciated that power supply 130 may also be arranged in many other configurations. By way of example, power supply 130 may be arranged as a unit which is supported on a surface such as a floor.

Command glove system 110 also includes cable wires 160 which enable power and signals to be transmitted between power supply 130 and sensor feedback glove 150. Power supplied via cable wires 160 is used to activate electronics which are a part of sensor feedback glove 150 or, more specifically, brake actuator assemblies 170 which are a part of sensor feedback glove 150. Brake actuator assemblies 170, which will be described in more detail below with respect to FIGS. 3a and 3b, generally include brakes which resist forces applied by a hand, and are mounted on a "sleeve" 180 of command glove system 10.

Sensor feedback glove 150, which will be described below with reference to FIG. 2a, is arranged such that hand movements made by the wearer of sensor feedback glove 150 cause a robotic manipulator 190, e.g., a remote robotic manipulator, to perform similar movements. That is, sensor feedback glove 150 is arranged to control the movements of robotic manipulator 190. In one embodiment, sensor feedback glove 150 is also arranged to provide the wearer of sensor feedback glove 150 with haptic sensations, including resistive forces, experienced by robotic manipulator 190. In order to provide the wearer of sensor feedback glove 150 with a sense of the haptic environment experienced by robotic manipulator 190, robotic manipulator 190 is arranged to transmit haptic signals to command glove system 110.

Referring next to FIG. 2a, a cross-section of a portion of the sensor feedback glove of FIG. 1 will be described in accordance with an embodiment of the present invention. Specifically, section A—A of sensor feedback glove 150 of FIG. 1 will be described. A glove body 210 of glove 150 is worn over a hand 214. Glove body 210 may generally be fabricated from any suitable material which is relatively lightweight and strong. Suitable materials include, but are not limited to, materials such as nylon or leather. In one embodiment, glove body 210 may include a cut-out portion 218 which serves to relieve resistance of glove body 210 to movement of hand 214 or, more specifically, a finger 222. Alternatively, cut-out portion 218 may serve to reduce the overall weight of glove 150.

Support fins 226a–d are coupled to glove body 210. In the described embodiment, each finger of hand 214, e.g., finger 222, may have a distal phalanx support fin 226a and a proximal phalanx support fin 226b. Distal phalanx support fin 226a is arranged to be positioned over a distal phalanx 230 of finger 222, while proximal phalanx support fin 226b is arranged to be positioned over a proximal phalanx 234 of finger 222. As such, degrees of freedom associated with distal phalanx 230 and proximal phalanx 234 may be controlled. A thumb 238 of hand 214 has a thumb tip support fin 226c positioned over a distal phalanx (not shown) of thumb 238, as well as a metacarpal support fin 226d positioned over a metacarpal bone area 242 of thumb 238.

Support fins 226a, 226b are arranged to create force at distal phalanx 230 of finger 220, while support fins 226c, 226d are arranged to create force at the distal phalanx of thumb 238. A cable 242a is coupled to distal phalanx support fin 226a, and, in the described embodiment, passes through proximal phalanx support fin 226b as will be described below with respect to FIG. 2b. When tension is applied to cable 242a, proximal phalanx support fin 226b acts as a moment arm to create a force at distal phalanx 230 or, more specifically, in the vicinity of finger tip 250. Similarly, when tension is applied to a cable 242b, which is coupled to thumb tip support fin 226c, proximal phalanx support fin 226d acts as a moment arm to create a force at the distal phalanx of thumb 222, i.e., the thumb tip. In general, cables 242a, 242b are coupled to brake actuator mechanisms which are arranged to drive cables 242a, 242b, as will be described below with reference to FIGS. 3a and 3b. Such mechanisms are typically positioned away from support fins 225a–d, as indicated by the direction of arrows 246a, 246b, respectively.

When tension is applied to cable 242a, such as when the grasping motion of hand 214 is resisted by brake actuator mechanisms, a moment which acts on finger 222 is created. The size of distal phalanx support fins 226a, 226c typically affects the moment arm created by distal phalanx support fins 226a, 226c. In particular, as the height of distal phalanx support fins 226a, 226c increases, the moment arm created by distal phalanx support fins 226a, 226c becomes longer. Moment arms are created, for example, to apply force to finger tip 250. Therefore, as the length of the moment arm increases, the force at finger tip 250 for a given tension increases. The force created using the moment arms is generally in a direction which simulates the contact of hand 214 with a solid object. That is, the force created resists the force applied by hand 214 when hand 214 is trying to close.

While the size of support fins 226a–d may be widely varied, in one embodiment, the height of proximal phalanx support fins 226b, 226d is approximately equal to the length of the corresponding distal phalanx. In other words, the height of proximal phalanx support fin 226b may be substantially the same as the length of distal phalanx 230 of finger 222, while the height of proximal phalanx support fin 226d may be substantially the same as the length of the distal phalanx of thumb 222. As such, the height of proximal phalanx support fins 226b, 226d may be in the range of approximately one centimeter to approximately three centimeters. Although the heights of proximal phalanx support fins 226b, 226d may be substantially larger than approximately three centimeters, the use of taller proximal phalanx support fins 226b, 226d may be cumbersome to a user. The heights of proximal phalanx support fins 226b, 226d may also be less than approximately one centimeter, although some of the mechanical advantage of the moment arms created by proximal phalanx support fins 226b, 226d may be compromised with shorter heights.

In general, support fins 226a–d may be made from any suitable substantially rigid material. By way of example, support fins 226a–d may be made of rigid plastic. One suitable plastic is AquaPlast, which is available commercially from Smith & Nephew, Incorporated of Germantown, Wis. Cables 242a, 242b, in one embodiment, may be fabricated from a material such as Kevlar, which is available commercially from Stren Fishing Lines, a Division of Remington Arms Company, Incorporated, of Wilmington, Del. Kevlar is a particularly suitable material from which cables 242a, 242b may be fabricated, due to the fact that cables 242a, 242b made from Kevlar do not stretch significantly. Alternatively, cables 242a, 242b may be fabricated from any monofilament material.

The interior surface of glove body 210 may include sensing and actuating assemblies 252a, 252b. As will be described in more detail below with respect to FIGS. 4a and 4b, sensing and actuating assemblies 252a, 252b are generally arranged to provide hand 214 with haptic sensations which are being experienced by a robotic manipulator which is being controlled using sensor feedback glove 150. Although sensing and actuating assemblies 252a, 252b may be positioned anywhere along the interior surface of glove body 210, in one embodiment, sensing and actuating assemblies 252a, 252b are positioned near distal phalanx 230 of finger 222 and near a palm 256 of hand 214, respectively.

To enable support fins 226a–d to be supported on glove body 210, support fins 226a–d may be shaped to substantially match the contour of finger 214. FIG. 2b is a diagrammatic cross-sectional representation of a proximal phalanx support fin in accordance with one embodiment of the present invention. That is, a cross-section of proximal phalanx support fin 226b, taken along line B—B, will be described. Flanges 264 of proximal phalanx support fin 226b, which is mounted on glove 210, is shaped to enable proximal phalanx support fin 226b to remain substantially upright while proximal phalanx support fin 226b is supported on finger 222. Specifically, a bottom surface 260 of flanges 264 is curved such that when glove 210 covers finger 222, proximal phalanx support fin 226b is at least partially supported on finger 222.

As mentioned above, a cable, e.g., cable 242a of FIG. 2a, passes through proximal phalanx support fin 226b. Since any cable which passes through proximal phalanx support fin 226b slides within proximal phalanx support fin 226b in response to tension which is applied to the cable, in the described embodiment, tube 268 is included in proximal phalanx support fin 226b. Tube 268 enables a cable to slide therein, and, therefore, prevents the cable from becoming displaced from proximal phalanx support fin 226b. In order to enable a cable to slide within tube 268 essentially without friction, tube 268 may be a coated with or fabricated using a low-friction material such as Teflon. In one embodiment, tube 268 may be curved to reduce bending stresses on the cable, e.g., cable 242a. In another embodiment, tube 268 may include a stress-relief portion. Such a stress-relief portion may take on a variety of different configurations. By way of example, a stress-relief portion may essentially be configured as a "track" over which the cable may slide.

The tips of fingers and thumbs generally experience more movement than other portions of the fingers and the thumbs. For example, the tips of fingers and thumbs may "pull away" from a glove Accordingly, it may be desirable to configure support fins located near finger tips and thumb tips, as for example thumb tip support fin 226c of FIG. 2a, to better withstand movement. In other words, support fins may be configured to basically encircle a finger or a thumb. FIG. 2c is a diagrammatic cross-sectional representation of one configuration of thumb tip support fin 226c in accordance with an embodiment of the present invention. Thumb tip support fin 226c includes a ring 270 which is sized to be mounted to glove 210 such that ring 270 encircles thumb 238. Ring 270 may be sized to enable thumb tip support fin 226c to essentially remain in a desired position with respect to thumb 238.

A cable, e.g., cable 242b of FIG. 2a, is coupled at one end to thumb tip support fin 226c. In one embodiment, the cable is coupled to thumb tip support fin 226c through a tube 272 which is a part of thumb support fin 226c. Tube 272 may be coated with or fabricated from Teflon to reduce the friction which occurs when the cable moves within tube 272 as the cable is tightened and released.

As mentioned above with respect to FIG. 2a, cables of a sensor feedback glove are coupled at one end to support fins. At another end, cables are coupled to brake actuator mechanisms which are arranged to restrict the motion of the cables in response to forces applied by or transmitted to the sensor feedback glove. With reference to FIGS. 3a and 3b, a brake actuator assembly, e.g., brake actuator assembly 170 of FIG. 1, will be described in accordance with an embodiment of the present invention. In general, in a command glove system, one brake actuator assembly 170 may be used to resist forces in each digit, e.g., finger, with degrees of freedom which are controlled. That is, each digit which is used to apply force to a robotic manipulator is essentially available to sense force from a robotic manipulator and, hence, is associated with a brake actuator assembly 170.

The number of digits with controlled degrees of freedom may be widely varied. A command glove system may include five brake actuator assemblies to accommodate the thumb and the four fingers of a human hand. In another embodiment, since it has been observed that the little, or "pinky," finger and the fourth, or "ring," finger tend to move together, it may not be necessary to separately monitor, or otherwise control, the little finger. Accordingly, in the described embodiment, a command glove system includes only four brake actuator assemblies.

Brake actuator assembly 170 includes a housing 304 which may be mounted on a sleeve of a command glove system, as previously mentioned. A constant force spring 308 is coupled to housing 304 and is further arranged to be coupled to a cable 312, or a tension line. The methods used to couple constant force spring 308 to housing 304 may be widely varied. In one embodiment, cable 312 is coupled to constant force spring 308 through a hook 314. In general, cable 312 is coupled to constant force spring 308 at one end, and to a support fin, e.g., support fin 226a of FIG. 2a, at another end.

Constant force spring 308 is oriented such that portions of constant force spring 308 which are in contact with an interior bottom surface 316 of housing 304, slide with respect to bottom surface 316 when constant force spring 308 is being extended. Rollers 320 are located over constant force spring 308 such that rollers 320 come into contact with constant force spring 308. Rollers 320 serve to guide constant force spring 308 as constant force spring 308 moves with respect to bottom surface 316. To facilitate a sliding motion between constant force spring 308 and bottom surface 316, in one embodiment, at least portions of bottom surface 316 may be coated with a material such as Teflon. Alternatively, rollers may be added between constant force spring 308 and bottom surface 316 to facilitate the sliding of constant force spring 308.

While constant force spring 308 moves in a direction indicated by an arrow 318, constant force spring 308 is extending, or in a state of tension. The extension of constant force spring 308 indicates that movement is being applied by the command glove associated with the spring, i.e., a human hand is initiating motion to command a robotic manipulator via the command glove. In other words, constant force spring 308 is being engaged in response to movement of the human hand or, more specifically, a finger of the hand.

When a transmission received from a robotic manipulator indicates that a resistive force is being experienced by the robotic manipulator, a solenoid 330 is actuated such that solenoid 330 activates a brake 334. Brake 334 is arranged to essentially stop constant force spring 308 from further extension when brake 334 is in a locked position, as shown. In general, brake 334 is mounted to housing 304. In one embodiment, a bottom surface 338 of brake 334 may be coated with a high friction material to prevent constant force spring 308 from sliding while brake 334 is in a locked position. Similarly, the portion of bottom surface 316 of housing 304 which is directly beneath bottom surface 338 of brake 334 when brake 334 is in a locked position may also be coated with a high friction material to further prevent constant force spring 308 from sliding when brake 334 is locked.

When the finger being controlled by brake actuator assembly 170 attempts to cause constant force spring 308 to extend while brake 334 is locked, constant force spring 308 is prevented from further extension, and resistance is experienced by the finger. In other words, the force exerted by the finger is essentially reflected back to the finger. As such, the finger senses resistance "exerted" by an object which is in contact with a robotic manipulator.

Although the tension in constant force spring 308 may be measured using any suitable method, in one embodiment, the tension is measured using a strain gage 324 mounted on constant force spring 308. In another embodiment, strain gage 324 may instead be mounted at a distal phalanx support fin, e.g., distal phalanx support fin 226a of FIG. 2a, as the tension in cable 312 generally creates strain in the associated distal phalanx support fin. Such a strain may then be sensed by strain gage 324.

Solenoid 330 is generally deactivated to unlock, or release, brake 334. In one embodiment, a return spring 342 may be attached to brake 334 such that once solenoid 330 is deactivated, return spring 342 serves to pull brake 334 away from constant force spring 308. It should be appreciated that solenoid 330 may be dithered at a relatively fast pace to simulate a "spongy," e.g., soft or mushy, sensation. Dithering solenoid 330 entails alternately activating solenoid 330 to lock brake 334 and deactivating solenoid 330 to enable return spring 342 to pull brake 334 back.

The position of the finger associated with brake actuator assembly 170 is monitored such that any relative movement of the finger may be transformed into a signal which is sent to a robotic manipulator. In order to determine the position of the finger associated with brake actuator assembly 170, the extension of constant force spring 308 is typically monitored using drive and encoder circuitry 346. In addition to being arranged to determine the position of an associated finger, drive and encoder circuitry 346 is arranged to power solenoid 330.

Force feedback circuitry and other sensor circuitry, e.g., circuitry arranged to process signals used to control movement of a robotic manipulator, may generally be included as a part of brake actuator assembly 170. However, in the described embodiment, force feedback circuitry, as well as other sensor circuitry, is typically included in a control device that is substantially separate from brake actuator assembly 170, although both force feedback circuitry and other sensor circuitry are in communication with brake actuator assembly 170. Such a control device is typically arranged to process signals, e.g., position signals, that are sent between a command glove system and a robotic manipulator to control the movement of the robotic manipulator and to provide information to the user of the command glove system.

Drive and encoder circuitry 346, in the described embodiment, includes an encoder wheel 350 that is held in contact with constant force spring 308. Encoder wheel 350 is monitored to measure the extension of constant force spring 308. For example, encoder wheel 350 may be monitored using two photodiode and transistor pairs, as will be appreciated by those skilled in the art. In general, the extension of constant force spring 308 may be tracked using any suitable mechanism. By way of example, constant force spring 308 may be patterned, or otherwise "calibrated," such that constant force spring 308 may be directly tracked to determine the extension of constant force spring. Alternatively, a linear potentiometer may be implemented to monitor the extension of constant force spring 308.

When brake actuator assembly 170 is located on an arm, as shown in FIG. 1, the determination of the position of the hand may be affected by the position of the wrist. Accordingly, finger positions may also be affected by wrist positions. As such, information from a sensor arrangement (not shown) arranged to measure the position of the wrist may be incorporated into calculations to determine hand positions.

It should be appreciated that in the event that the position of a wrist is not to be monitored, brake actuator assembly 170 may be positioned away from wrist, as for example on the back of a hand, or between the distal phalanx and the proximal phalanx of a finger. When brake actuator assembly 170 is positioned between finger tips and a wrist, the orientation of the wrist does not affect the functions of brake actuator assembly 170, and braking may occur while the wrist is moving.

Figure 4A:
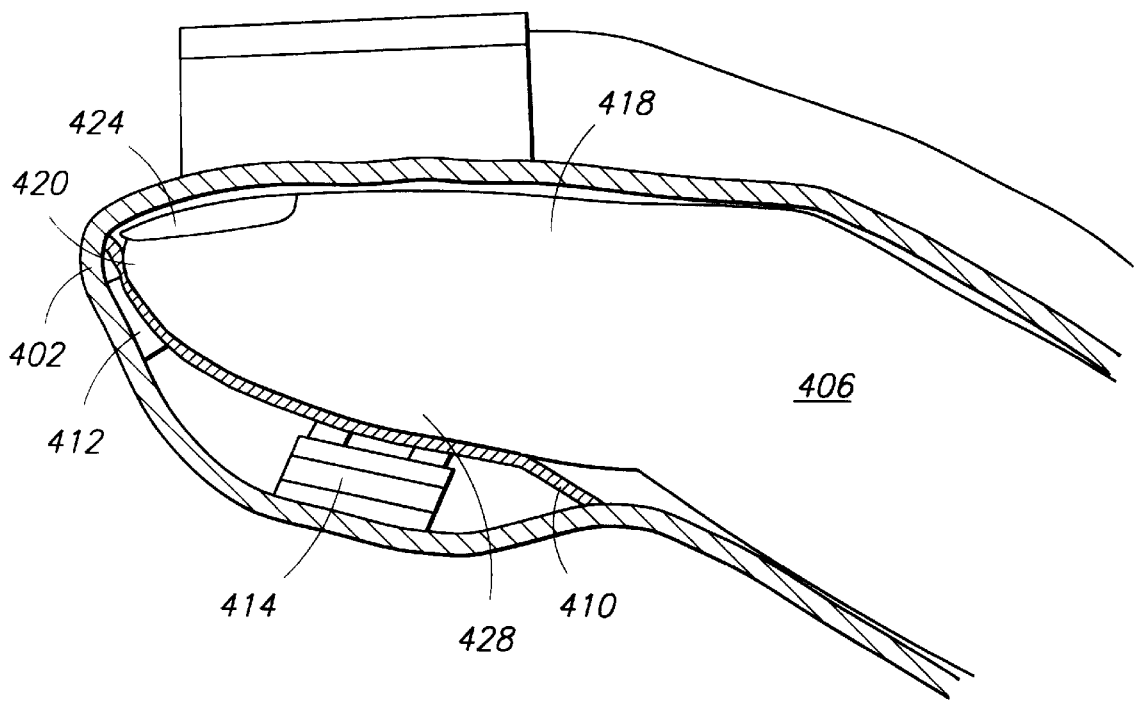
FIG. 4a is a diagrammatic representation of the interface between a finger and a sensing and actuating assembly in accordance with an embodiment of the present invention.

When an object is grasped with a hand, it has been observed that the object is most often grasped using the pads near the tip of the finger and the palm of the hand. Accordingly, sensor arrangements and actuators may be located near the palm and finger tips, as well as the thumb tip, of a hand to accurately "transfer" haptic sensations from a remote environment to the hand. FIG. 4a is a diagrammatic representation of the interface between a finger and a sensing and actuating assembly in accordance with an embodiment of the present invention. A glove 402, e.g., a sensor feedback glove, at least partially encases a finger 406 and includes an inner lining 410. Inner lining 410 is arranged over a vibration actuator 412 and a sensing and actuating assembly 414, which will be described below with respect to FIG. 4b, such that sensing and actuating assembly 414 does not come into direct contact with a distal phalanx 418 or, more specifically, a pad 428, of finger 406. Although inner lining 410 may be eliminated, the use of inner lining 410 serves to at least partially protect finger 406 in the event that sensing and actuation assembly 414 overheats. In general, inner lining 410 is made from any strong, thin material including, but not limited to, mylar, Goretex, and nylon mesh.

Vibration actuator 412, which, in one embodiment, may be a microsolenoid, is located at a tip 420 of finger 406 and transmits vibrations to finger 406. In general, both tip 420 and a fingernail 424 of finger 406 are able to sense vibrations. Accordingly, vibration actuator 412 may either be located at tip 420, as shown, or on fingernail 424.

Figure 4B:
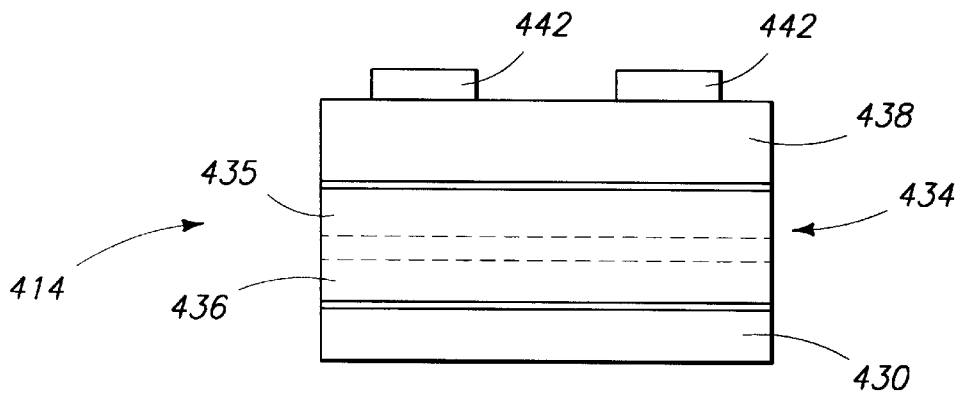
FIG. 4b is a diagrammatic representation of a sensing and actuating assembly, i.e., sensing and actuating assembly 414 of FIG. 4a, which is a arranged as a stacked array in accordance with an embodiment of the present invention.

Sensing and actuating assembly 414 may generally be a "horizontal" array of sensor arrangements and actuators which are placed next to each other. On the other hand, sensor arrangements and actuators in sensing and actuating assembly 414 may be arranged in a "stacked" orientation, where one sensor or actuator is essentially placed on top of another sensor or actuator. FIG. 4b is a diagrammatic representation of sensing and actuating assembly 414 of FIG. 4a in accordance with an embodiment of the present invention. Sensing and actuating assembly 414 includes sensor arrangements and actuators which are oriented in a stacked orientation. Although sensing and actuating assembly 414 may generally include any number of sensor arrangements and actuators, in one embodiment, sensing and actuating assembly 414 includes a vibration actuator 430, a thermoelectric cooler 434, a heater 438, and thermal sensors 442.

Vibration actuator 430 is arranged to transmit a sense of vibration and roughness to a pad of a finger, e.g., pad 428 of finger 406 as shown in FIG. 4a. Suitable vibration actuators 430 include, but are not limited to, piezoelectric elements, miniature speakers, and micro-solenoids.

Thermoelectric cooler 434 provides hot and cold sensations. In the described embodiment, thermoelectric cooler 434 is arranged such that when current is provided to thermoelectric cooler 434 in a particular direction, a first side of thermoelectric cooler, e.g., side 435, is cooled, while a second side of thermoelectric cooler, e.g., side 436, is heated. While suitable thermoelectric coolers 434 may be widely varied, one suitable thermoelectric cooler 434 is commercially available from Melcor of Trenton, N.J.

Heater 438 is arranged to enable sensing and actuating assembly 414 to provide a sense of heat to a user. It should appreciated that, in some embodiments, heater 438 may be eliminated and thermoelectric cooler 434 may be considered to be sufficient for providing a sense of heat to a user. Although the type of heater 438 used in sensing and actuating assembly 414 may be widely varied, in one embodiment, heater 438 is a thin-foil heater. One suitable thin-foil heater is available from Minco Products, Incorporated of Minneapolis, Minn.

In the described embodiment, thermal sensors 442, or sense effectors, are used for feedback control. In other words, thermal sensors 442 may be used to regulate the amount of heat which is provided by either thermoelectric cooler 434 or heater 438 to accurately simulate the amount of heat experienced by a robotic manipulator which is in communication with sensing and actuating assembly 414. Thermal sensors 442 may generally be located near the surface of a finger, for example, to facilitate the accurate measurement of the amount of heat felt by the finger. Although any suitable type of thermal sensor 442 may be used in sensing and actuating assembly 414, in one embodiment, thermal sensor 442 is a thermocouple.

While the "order" of sensor arrangements and actuators in the stacked orientation of sensing and actuating assembly 414 may be widely varied, in the described embodiment, thermal sensors 442 are located closest to the surface of finger 406 such that thermal sensors 442 may accurately measure the amount of heat experienced at finger 406, as mentioned above. As shown, heater 438 is arranged directly below thermal sensors 442, while thermoelectric cooler 434 is arranged below heater 438. Vibration actuator 430 is located below thermoelectric cooler 434 and, hence, is located furthest from the surface of finger 406. It should be appreciated that, in general, the orientation of vibration actuator 430, thermoelectric cooler 434, heater 438, and thermal sensors 442, with respect to one another, may be widely varied.

Figure 5A:
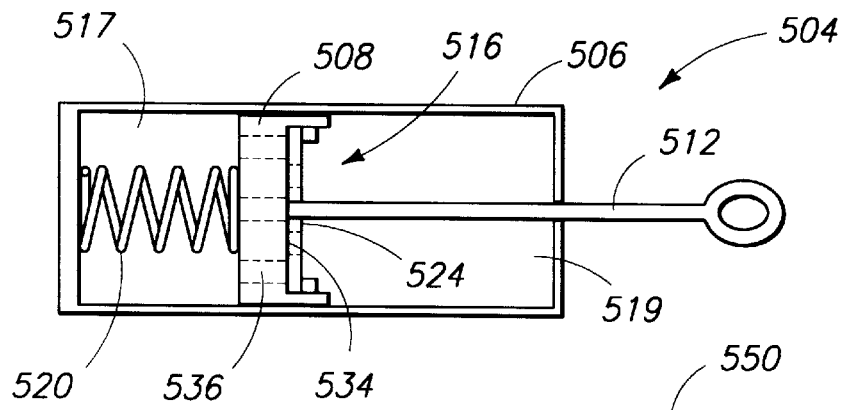
FIG. 5a is a diagrammatic side-view representation of a hydraulic braking assembly in a braked position in accordance with an embodiment of the present invention.
Figure 5B:
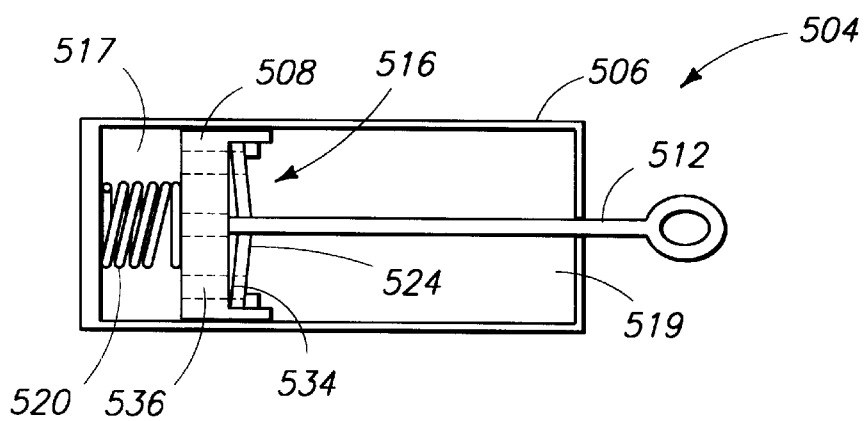
FIG. 5b is a diagrammatic side-view representation of the hydraulic braking assembly of FIG. 5a in an unbraked position in accordance with an embodiment of the present invention.

As described above with reference to FIGS. 3a and 3b, in one embodiment, a brake actuator assembly used to resist forces applied by a human hand may include a constant force spring. In general, however, other suitable brake actuator assemblies may be used to resist forces applied by a human hand. By way of example, a hydraulic piston arrangement, such as a hydraulic cylinder, may be implemented for use in resisting forces. FIGS. 5a and 5b are a diagrammatic representation of one hydraulic piston actuator assembly in accordance with an embodiment of the present invention. A piston actuator assembly 504 includes a housing 506 which contains a piston 508. In general, piston actuator assembly 504 serves substantially the same purpose as the braking mechanism described above with respect to FIGS. 3a and 3b.

Piston 508 is coupled with a shaft 512 which, in turn, is generally coupled to, or otherwise linked with, a cable, e.g., cable 242a of FIG. 2a. As such, since shaft 512 is generally coupled to a human finger through a cable, piston 508 is therefore able to move in response to motions of the finger. A release spring 520 is connected to piston 508 and housing 506, and is arranged to retract piston 508 when necessary, as will be discussed below.

Piston 508 is coupled to a valve arrangement 516. In one embodiment, valve arrangement 516 controls the flow of a fluid such as air, within housing 506. In other words, when valve arrangement 516 is in a "closed" position, as shown in FIG. 5a, the fluid is not allowed to flow through valve arrangement 516 and into a first section 517 within housing 506. Alternatively, when valve arrangement 516 is in an "open" position, as shown in FIG. 5b, the fluid may flow through valve arrangement 516 and into first section 517. Although the configuration of valve arrangement 516 may generally be widely varied, one particularly suitable configuration of valve arrangement 516 will be described in more detail below with reference to FIG. 5c.

When valve arrangement 516 is in a closed position, release spring 520 is extended. In the described embodiment, release spring 520 is an extension spring. With valve arrangement 516 in a closed position, piston 508 may not move. Valve arrangement 516 may be closed when, for example, piston 508 is moved in a direction specified by arrow 550. Moving piston 508 in the direction specified by arrow 550 allows a piston 508 to essentially be pulled against membrane 524. Membrane 524, which is generally a thin, flexible disk, includes holes 532, as shown more clearly in FIG. 5c.

Figure 5C:
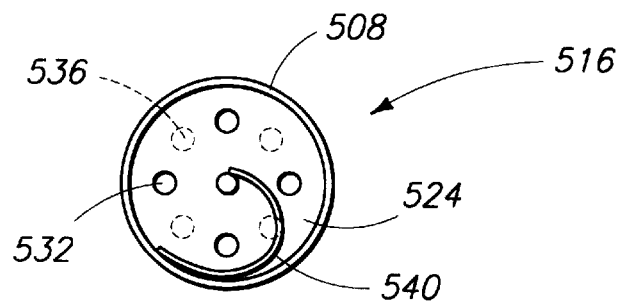
FIG. 5c is a diagrammatic representation of a valve arrangement suitable for use with the hydraulic braking assembly of FIG. 5a in accordance with an embodiment of the present invention.

Piston 508 generally includes holes 536 through which the fluid may pass. As shown in FIG. 5c, holes 532 are not aligned with holes 536. As such, the fluid may not flow to or from first section 517, thereby effectively locking piston 508 in place. When piston actuator assembly 504 is in a closed, or locked, position, membrane 524 is sealed against piston 508, such that holes 534 are not in alignment with holes 536. Hence, no fluid is allowed to pass through valve arrangement 516, i.e., first section 517 may not be pressurized or depressurized. When additional fluid is not allowed to enter or exit first section 517, piston 508 generally may not be moved. Therefore, piston 508, shaft 512, and, hence, a cable coupled to shaft 512, are essentially locked in place and, effectively, "braked."

A shape memory metal strip 540 which is coupled to membrane 524, as shown in FIG. 5c, may be electrically activated to rotate membrane 524 to either open or close valve arrangement 516. That is, shape memory metal strip 540 may be activated in response to signals received from a robotic manipulator. For example, shape memory metal strip 540 may cause membrane 524 to be rotated to align holes 532 with holes 536 to allow the fluid to flow between first section 517 and a second section 519 of housing 506 in response to signals transmitted from a robotic manipulator. When valve arrangement 516 is open, however, since the fluid is allowed to freely flow into and out of chamber 506, piston 508 is essentially free to move within chamber 506. When shaft 512 is moved in the direction of arrow 550, the fluid generally flows from second section 519 to first section 517, thereby essentially generating a higher pressure in first section 517 than in second section 519. This higher pressure causes membrane 524 to cling to piston 508 to allow the fluid to flow substantially only through the overlapping space of holes 532 and 536. An opposite motion, e.g., a motion in a direction opposite of that indicated by arrow 550, reverses the pressure difference and releases membrane 524 from piston 508. The reversed pressure difference allows the free flow of fluid from second section 519 to first section 517 for minimum resistance to the movement of a finger.

In one embodiment, release spring 520 may be arranged to facilitate the pulling of piston 508 away from membrane 524 when holes 532 and 536 are aligned. It should be appreciated that the hole 532 and 536 may be partially aligned to enable partial flow to occur between first section 517 and second section 519. Therefore, by controlling the relative alignment of holes 532 and 536, the resistance of piston 508 to movement, e.g., movement of a human finger coupled to shaft 512 through a cable, may be varied.

Although only a few embodiments of the present invention have been described, it should be understood that the present invention may be embodied in many other specific forms without departing from the spirit or scope of the invention. By way of example, although a sensor feedback glove has been described in terms of having support fins mounted on a glove body, the support fins may instead come into direct contact with a human hand. In other words, support fins may be shaped, as for example with ring collars, such that the support fins may be directly slipped over fingers, thereby eliminating the use of a glove body. Sensing and actuating assemblies, instead of being mounted on an interior surface of a glove body, may then also be mounted on pliable elements that bridge the space between subsequent collars, thereby coming into substantially direct contact with a hand.

The location of support fins, with respect to the human hand, may also be varied. For example, rather than having a support fin located over a distal phalanx of a finger, the support fin may be located over a middle phalanx of the finger without departing from the spirit or the scope of the present invention.

The use of a strain gage in conjunction with a constant force spring enables tension in the spring and, hence, the cable coupled to the spring, to be measured. In general, the location of the strain gage may be varied. By way of example, the strain gage may be placed "on" the cable. In one embodiment, the cable may be cut such that a strain gage serves to couple the two sections of the cable. Alternatively, in another embodiment, the cable may be threaded through a strain gage.

In addition, devices which are used to measure tension in cables may be widely varied. In lieu of strain gages or resistive sensors, any device which is capable of measuring tension, e.g., strain, may be used. By way example, any suitable sensors which are based on reluctance, capacitance, vibrating wires, or photo-optics may be used to measure tension in the cables.

Although sensing and actuating assemblies have been described as being located at or near finger tips and palms, sensing and actuating assemblies may generally be located anywhere on a hand. By way of example, sensing and actuating assemblies may be located at the proximal phalanxes of fingers, or at the back of a hand. Sensing and actuating assemblies may also be located such that they either contact or are located on fingernails.

Sensing and actuating assemblies have also been described as essentially being an array of sensors and actuators which includes a vibration actuator, a thermoelectric cooler, a heater, and a thermal sensors. However, it should be appreciated that sensing and actuating assemblies may also include many other haptic sensors and actuators, including, but not limited to, thermistors or other heat sensors. On the other hand, sensing and actuating assemblies may also include fewer sensors and actuators without departing from the spirit or the scope of the present invention. For example, a sensing and actuating assembly may not include a heater in the event that a thermoelectric cooler is sufficient to provide a sense of heat to a human. Also, a vibration actuator may be used without any other sensors or actuators when only a sense of vibration is desired.

Tubes, e.g., Teflon tubes or Teflon coated tubes, have been described as being included as a part of support fins to enable cables to slide within the tubes as cables pass through the support fins. In one embodiment, rather than including tubes as a part of support fins, holes may be bored through the support fins to enable cables to pass therethrough. Such holes may also be coated with Teflon to reduce friction between the surfaces of the holes and the cables. Alternatively, rather than creating holes in support fins, grooves may instead be created in support fins to support and at least partially confine the cables.

Further, although the command glove system has been described as using constant force springs to drive cables on the sensor feedback glove, it should be appreciated that many other mechanisms may be used to drive the cables without departing from the spirit or the scope of the present invention. For example, motors, e.g., electric motors or hydraulic motors, may be used to drive the cables. When motors are used to drive the cables, it is possible that the use of separate braking mechanisms may be eliminated. That is, the motors may include braking mechanisms. In addition, some motors may enable the retraction of the cables to be substantially dithered, thereby providing a user wearing the sensor feedback glove to experience a variety of sensations, e.g., a "spongy" feel. Alternatively, in lieu of an motor, a plurality of solenoids, hydraulic cylinders, or pneumatic cylinders may instead be implemented to dither the retraction of the cables by, for example, dithering the activation and deactivation of a brake which is arranged to affect the extension of a constant force spring.

For embodiments in which hydraulic actuators are used to provide resistance in a command glove system, although the use of a release spring has been described as being effective to allow a piston to pull away from valve arrangement, it should be appreciated that other mechanisms may be used in lieu of a release spring. By way of example, some hydraulic actuators may include air pockets in accumulators which are adjacent to a piston-containing chamber. Such an air pocket may essentially function as a release spring. Further, while a valve arrangement associated with a hydraulic actuator may be physically located near a piston, the valve arrangement may also be located away from the piston. In one embodiment, such a valve arrangement may, be arranged to be opened and closed using fluid which passes out of second chamber 519 of FIGS. 5a and 5b. In such an embodiment, the valve arrangement may be coupled to second chamber 519 using a hose such as, for example, an air hose.

While a command glove system has been described as being used in terms of controlling a robotic manipulator, it should be appreciated that the command glove system may also be used for many other applications. By way of example, the command glove system is suitable for use as a part of a virtual reality device. A person who is involved in a virtual reality environment, e.g., a virtual reality game, may use the command glove system to simulate an interface of a virtual entity, such as a person or a device, with virtual objects. Therefore, the present examples are to be considered as illustrative and not restrictive, and the invention is not to be limited to the details given herein, but may be modified within the scope of the appended claims.

What is claimed is:

1. An apparatus for controlling a device, the apparatus being arranged to be at least partially supported on and operated by a human appendage, the apparatus further being arranged to transmit signals to and receive signals from the device, the apparatus comprising:

a positioning assembly substantially mounted on the human appendage, the positioning assembly for responding to motions of the human appendage, the positioning assembly further transmitting position signals to the device to control the device, wherein the positioning assembly includes a spring arranged to extend in response to the motions of the human appendage;

a braking assembly for resisting motion of the positioning assembly, the braking assembly being coupled to the positioning assembly, the braking assembly being responsive to resistance signals received from the device, the resistance signals being substantially indicative of a force that is transmitted to the device wherein the braking assembly includes a brake, the brake being arranged to prevent the spring from extending in response to the resistance signals received from the devices, and a solenoid, the solenoid being arranged to activate the brake in response to the resistance signals received from the device, wherein the solenoid is in communication with the device; and a sensing assembly for transforming haptic signals received from the device into sensations felt by the human appendage, the sensing assembly being coupled to the positioning assembly.

2. An apparatus as recited in claim 1 wherein the positioning assembly includes a tracking sub-assembly for monitoring the extension of the spring.

3. A method for receiving at least one haptic sensation from a remote device, a first selected one of the haptic sensations being arranged to represent a resistive force encountered by the remote device, the method comprising:

providing a positioning mechanism which is responsive to motions of a human appendage, the positioning mechanism being arranged to send position signals to the remote device;

mounting the positioning mechanism on the human appendage;

moving the human appendage, wherein moving the human appendage causes the positioning mechanism to engage;

controlling movement of the remote device with the position signals;

sensing resistive forces encountered by the remote device during the movement of the remote device;

producing a resistance signal as a function of the sensed resistive forces;

providing a braking mechanism for resisting motion of the positioning mechanism, wherein providing the braking mechanism includes providing a brake which is coupled to a solenoid which is arranged to activate the brake; and transmitting the resistance signal to the braking mechanism, wherein the braking mechanism engages the positioning mechanism to resist motion of the positioning mechanism.

4. A method as recited in claim 3 wherein providing the positioning mechanism includes providing a constant force spring arrangement.

5. A method as recited in claim 3 further including:

sensing a thermal sensation encountered by the remote device during the movement of the remote device;

producing a thermal signal as a function of the sensed thermal sensation;

providing a thermal sensor arrangement on the human appendage; and transmitting the thermal signal to the thermal sensor arrangement, wherein the thermal sensor arrangement provides an approximation of the thermal sensation to the human appendage.

6. A method as recited in claim 3 further including:

sensing a vibratory sensation encountered by the remote device during the movement of the remote device;

producing a vibratory signal as a function of the sensed vibratory sensation;

providing a vibration actuator arrangement on the human appendage; and transmitting the vibratory signal to the vibratory actuator arrangement, wherein the vibratory actuator arrange- ment provides an approximation of the vibratory sensation to the human appendage.

* * * * *